(No Model.)

H. ROSAMYER, Jr.
CLOSURE FOR JAR CAPS.

No. 397,094. Patented Jan. 29, 1889.

WITNESSES:
H. L. Gill.
N. B. Corwin.

INVENTOR,
Henry Rosamyer Jr.
by W. Bakewell & Sons
Att'ys

United States Patent Office.

HENRY ROSAMYER, JR., OF ROCHESTER, PENNSYLVANIA, ASSIGNOR OF ONE-HALF TO GEORGE W. MILLER, OF SAME PLACE, AND JOHN GRIPP, OF PITTSBURG, PENNSYLVANIA.

CLOSURE FOR JAR-CAPS.

SPECIFICATION forming part of Letters Patent No. 397,094, dated January 29, 1889.

Application filed April 2, 1888. Serial No. 269,276. (No model.)

*To all whom it may concern:*

Be it known that I, HENRY ROSAMYER, Jr., of Rochester, in the county of Beaver and State of Pennsylvania, have invented a new and useful Improvement in Closures for Jar-Caps; and I do hereby declare the following to be a full, clear, and exact description thereof, reference being had to the accompanying drawings, forming part of this specification, in which—

Figure 1:
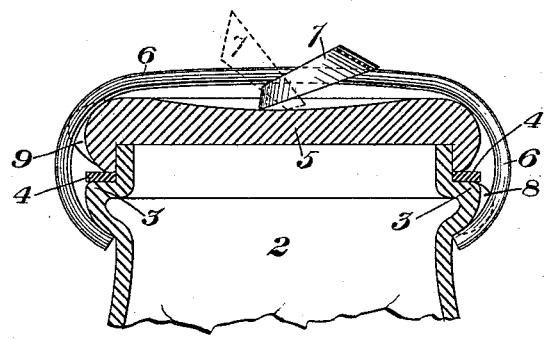
Figure 2:
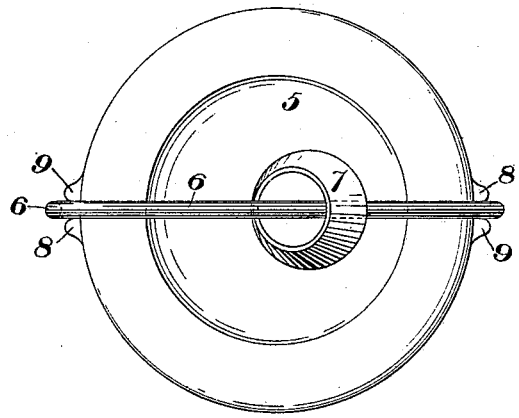
Figure 3:
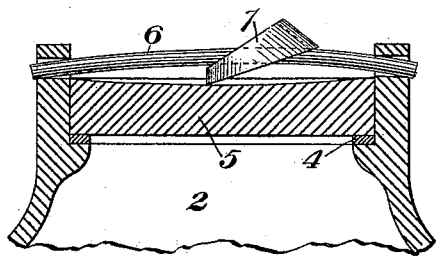
Figure 4:

Figure 1 is a vertical central section through the top part of a jar provided with my improved device, whereby the lid is held on the jar and the jar sealed thereby. Fig. 2 is a plan view thereof. Fig 3 is a vertical central section showing a modified form of my improvement. Fig. 4 is a perspective view of the annular lever by which the cover is clamped to its seat. This figure shows a modified form of the annular lever.

Like symbols of reference indicate like parts in each.

The object of my invention is to provide a closing device for jars which shall be cheap in construction and very efficient in its action, being designed to supply a want in this regard which has long been felt by the trade. Devices which have hitherto been used have been objectionable either because of their too great complication or cost or because they have not been sufficiently effective to seal the jars with proper security.

My invention is applicable both to glass jars and to jars made of earthenware. The jar which I show in Figs. 1 and 2 is made of glass, while that which I show in Fig. 3 is an earthenware jar.

In the drawings, 2 represents the neck of the jar, which is provided with an annular shoulder, 3, whereon is placed a rubber gasket, 4.

5 is the lid of the jar, which is adapted to fit upon the gasket 4, and 6 is a metal bail which is placed over the lid and has its ends bent so as to fit under the shoulder 3.

As thus described, the jar and cover are not of my invention, but have been used in different ways in prior devices. My invention is therefore not restricted to the specific form and arrangement of these parts, since they may be greatly varied; but it consists in the means whereby pressure is applied to the bail for the purpose of holding the lid to its seat and sealing the jar. For this purpose I employ a lever, 7, which is in the form of a ring, through which the bail 6 passes, as shown in Figs. 1 and 2. When the parts have been adjusted, as shown in dotted lines in Fig. 1, with the side of the ring lying flatly beneath the bail, the ring 7 is moved to the position shown in full lines, and the effect of the side of the ring being thus brought into a vertical position and acting on the top of the lid 5 and the under side of the bail is to cause a force thereon which will clamp the lid very firmly to its seat.

I prefer to make the ring 7 with its side inwardly inclined, thus making it conical in form, so that when it is brought into the position shown by full lines in Fig. 1, with its outer end resting on top of the bail 6, the line of its forward end shall be somewhat backwardly inclined. The effect of this is that the pressure caused by the elasticity of the bail on the ring tends to hold the latter in place. I also prefer to make the side of the ring 7 of varying width, as shown in the drawings, so that by turning it axially the width of the part between the bail and the lid may be changed and the degree of pressure to be exerted on the bail by moving the ring correspondingly varied to suit the condition of the particular lid and bail to which it is to be applied.

In order to make the device as stable as possible, I prefer to make the top of the lid 5 concave, as shown in Fig. 1. Then if through an accident the ring should be moved longitudinally along the bail from the center of the lid toward the periphery the surface inclination of the lid causes the ring and bail to bind more firmly, and thus prevents loosening of the lid. As an additional improvement, designed for the purpose of holding the bail in place when it is being tightened by the ring 7, I prefer to provide the body of the jar just beneath the shoulder 3 with lugs 8, made diametrically opposite to each other, and to provide the lid of the jar at the side with lugs 9, also made diametrically opposite to each other. In adjusting the bail to the jar, after the cap has been set in place, I turn the bail so that it shall be in contact with the sides of the lugs 8, and then turn the lid on the jar so as to bring the lugs 9 into contact with the sides of the bail, thus grasping the bail on both sides of the jar between the pairs of lugs 8 and 9, as clearly shown in Fig. 2. The ring 7 may then be moved to tighten the bail without danger of displacing it.

In the modification shown in Fig. 3 the bail, instead of being curved and fitting against the under side of an annular shoulder, 3, as shown in Fig. 1, is arranged so as to enter opposite holes made in the neck of the jar, the lid being set on an internally-projecting shoulder beneath the holes.

In Fig. 4 the ring 7 is shown as being made of conical form, for the purpose above indicated, and as being made with its side tapering in width. The taper is, however, spiral in form, instead of being made as shown in the other figures, where the form of the ring is that of a cone cut by a plane at an angle to its axis.

It will be noticed that the side of that part of the ring 7 which is between the bail and the lid is necessarily not circular in cross-section, but is of greater diameter in one direction than in the other, so that when moved to clamp the bail it shall act thereon after the manner of an eccentric. By use of the word "ring," unless otherwise expressly stated in the claims, I do not intend that the outline of the article shall be necessarily circular, since it may be oblong or polygonal, nor that it shall necessarily be an unbroken ring, it being only necessary that there shall be a part of the ring between the bail and lid which is of the shape in cross-section above noted and a part above the bail which rests thereon when the lid is clamped to its seat. The ring may therefore be open at the side and variously modified in form. I use the word "ring" in this sense in the claims.

The invention is particularly valuable on account of its simplicity, there being no complicated pivotal connections or other parts to increase the expense of manufacture.

I claim—

1. As a device for closing jars, the combination of a lid having a concave outer surface, a bail arranged over the lid, and a ring through which the bail passes, the cross-section of that part of the ring which lies between the bail and the lid being greater in one dimension than in the other, substantially as and for the purposes described.

2. As a device for closing jars, the combination of a lid, a bail arranged over the lid, and a ring through which the bail passes, that part of the side of the ring which lies between the bail and the lid being in cross-section greater in one dimension than in the other and being backwardly-inclined from a vertical position when the lid is clamped to its seat, substantially as and for the purposes described.

3. As a device for closing jars, the combination of a lid, a bail arranged over the lid, and a ring through which the bail passes, that part of the side of the ring which is adapted to lie between the bail and the lid being of greater diameter in cross-section in one direction than in the other and being of varying width, whereby it is adjustable, substantially as and for the purposes described.

4. As a device for closing jars, the combination of a lid, a bail arranged over the lid, and a lever placed loosely between the lid and bail and movable to cause a pressure thereon whereby the lid is forced to its seat, said jar having opposite lugs or projections against which the bail fits, and the lid also having opposite lugs or projections, substantially as and for the purposes described.

5. As a device for closing jars, the combination of a lid, a bail arranged over the lid, and a ring through which the bail passes, the said ring being in the shape of a frustum of a cone, the cross-section of that part of the ring which lies between the bail and the lid being greater in one dimension than in the other, substantially as and for the purposes described.

In testimony whereof I have hereunto set my hand this 27th day of March, A. D. 1888.

HENRY ROSAMYER, JR.

Witnesses:
W. B. CORWIN,
JNO. K. SMITH.